United States Patent
Teletzke et al.

(10) Patent No.: US 11,819,798 B2
(45) Date of Patent: *Nov. 21, 2023

(54) SCRUBBING FLUID AND METHODS FOR USING SAME

(71) Applicant: Ineos Americas, LLC, Mobile, AL (US)

(72) Inventors: Eric Matthew Teletzke, Iowa Colony, TX (US); Flavia Mariana Dos Santos Bates, Denver, CO (US); Brett Christopher Roberts, Little Elm, TX (US); Erik John Stewart, Pearland, TX (US); Kathleen Yvonne Turk, Livermore, CA (US)

(73) Assignee: INEOS AMERICAS, LLC, Mobile, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,461

(22) Filed: Jan. 24, 2022

(65) Prior Publication Data

US 2022/0219113 A1  Jul. 14, 2022

Related U.S. Application Data

(63) Continuation of application No. 17/033,044, filed on Sep. 25, 2020, now Pat. No. 11,229,875.

(51) Int. Cl.
*B01D 53/14* (2006.01)
*B01D 53/50* (2006.01)
*B01D 53/52* (2006.01)

(52) U.S. Cl.
CPC ..... *B01D 53/1493* (2013.01); *B01D 53/1462* (2013.01); *B01D 53/507* (2013.01); *B01D 53/526* (2013.01); *B01D 2257/302* (2013.01); *B01D 2257/304* (2013.01); *B01D 2257/306* (2013.01); *B01D 2257/504* (2013.01); *B01D 2259/40013* (2013.01); *B01D 2259/40028* (2013.01)

(58) Field of Classification Search
CPC ............ B01D 53/1493; B01D 53/507; B01D 53/526; B01D 53/1462; B01D 2259/40028; B01D 2257/304; B01D 2257/306; B01D 2257/504; B01D 2259/40013; B01D 2257/302
See application file for complete search history.

(56) References Cited

U.S. PATENT DOCUMENTS

| | | | |
|---|---|---|---|
| 4,336,233 A | 6/1982 | Appl et al. | |
| 6,207,121 B1 | 3/2001 | Rooney | |
| 6,740,230 B1 | 5/2004 | Hugo et al. | |
| 8,221,712 B2 | 7/2012 | Vorberg et al. | |
| 8,529,857 B2 | 9/2013 | Sieder et al. | |
| 10,464,013 B2 * | 11/2019 | Vorberg | B01D 53/1468 |
| 10,646,818 B2 | 5/2020 | Cruz et al. | |
| 11,229,875 B1 * | 1/2022 | Teletzke | B01D 53/1462 |
| 2012/0251418 A1 | 10/2012 | Sieder et al. | |
| 2015/0073150 A1 * | 3/2015 | Rochelle | B01D 53/1475 252/189 |

FOREIGN PATENT DOCUMENTS

| | | | | |
|---|---|---|---|---|
| CN | 1 258 226 A | * | 6/2000 | ......... B01D 53/1456 |
| CN | 104 203 818 A | * | 12/2014 | ......... B01D 53/1456 |
| EP | 0134948 | | 3/1985 | |
| KR | 2018 0 021 519 | * | 3/2018 | ......... B01D 53/1425 |

OTHER PUBLICATIONS

MDEA/Piperazine as a solvent for CO2 capture, Energy Procedia, Feb. 2009, pp. 1351-1357, vol. 1, Issue 1, Fred Closmann, Thu Nguyen, Gary T Rochelle.
How Stripping Promoters Work, The Contactor, Sep. 2013, 2 pages, vol. 7, Issue 9. Optimized Gas Treating, Inc.
Phosphoric Acid and Amines that Form Carbamate, The Contactor, Jul. 2015, 2 pages, vol. 9 Issue 7, Optimized Gas Treating, Inc.
Enhanced Treating Using MDEA With H3PO4, The Contactor, Apr. 2020, 2 pages, vol. 14, Issue 4, Optimized Gas Treating, Inc.

* cited by examiner

*Primary Examiner* — Timothy C Vanoy
(74) *Attorney, Agent, or Firm* — Roy Kiesel Ford Doody & North, APLC; Brett A. North

(57) ABSTRACT

A scrubbing solution for removing contaminants, including particularly hydrogen sulfide, from a fluid. The scrubbing solution includes at least one scrubbing reagent which has a primary or secondary amine and an acid, which may be phosphoric acid. The fluid being scrubbed is passed through the scrubbing solution. The contaminants react with the scrubbing reagent securing them in the scrubbing solution. The fluid being scrubbed and the scrubbing solution are then separated. The scrubbing solution is heated and, if the scrubbing solution is under pressure, the pressure is reduced. The acid facilitates thorough removal of the contaminants, and especially the hydrogen sulfide, from the scrubbing solution. The scrubbing solution is then ready for reuse. Because the scrubbing solution is rendered substantially free of hydrogen sulfides, it can absorb other sulfide contaminants that might not otherwise be absorbed.

20 Claims, 7 Drawing Sheets

Figure 1

|  | Day 1 | Day +2 |
|---|---|---|
| Scrubbing reagent | MDEA (39.1% by wt) Piperazine (8.1% by wt.) | MDEA (41.3% by wt.) Piperazine (7.7% by wt.) |
| Acid in scrubbing fluid | none | $H_3PO_4$ (1.39% by wt.) 0.033 moles acid/mole amine |
| Incoming Gas Conditions (before scrubbing) | | |
| Flow rate (MMSCFD) [m3/hr] | (58.1)[68558] | (58.3)[68794] |
| Temperature (F)[C] | (102.1)[38.9] | (105.1)[40.6] |
| Pressure (psig)[kPa] | (895)[6171] | (893)[6157] |
| $CO_2$ (mol %) | 1.09 | 1.28 |
| $H_2S$ (mol %) | 0.16 | 0.33 |
| Gas Conditions (after scrubbing) | | |
| Temperature (F)[C] | (126.8)[52.7] | (134.2)[56.8] |
| Pressure (psig)[kPa] | (891)[6143] | (889)[6129] |
| $H_2S$ (ppm) | 0.321 | 0.07 |
| $CO_2$ | undetectable (less than 100 ppmv) | undetectable (less than 100 ppmv) |
| Conditions in Desorption Column | | |
| Overhead Temperature (F)[C] | (233.1)[111.7] | (232.2)[111.2] |
| Overhead presure (psig)[kPa] | (14.8)[102.0] | (17)[117.2] |

Figure 2

|  | Day 1 | Day +33 | Day +35A | Day +35B | Day +38 |
|---|---|---|---|---|---|
| Scrubbing Reagent | MDEA (39.76 % by wt) Piperazine (8.25 % by wt.) | MDEA (39.90 % by wt) Piperazine (8.07 % by wt.) | MDEA (41.34 % by wt) Piperazine (7.71 % by wt.) | MDEA (41.30 % by wt) Piperazine (7.88 % by wt.) | MDEA (45.54 % by wt) Piperazine (8.37 % by wt.) |
| Acid in Scrubbing Fluid | none | none | $H_3PO_4$ (1.39 % by wt.) - 0.033 moles acid / mole amine | $H_3PO_4$ (1.33 % by wt.) -0.031 moles acid / mole amine | $H_3PO_4$ (1.14 % by wt.) - 0.026 moles acid / mole amine |
| Scrubbing Fluid Content (After desorption) |  |  |  |  |  |
| Amine Content - wt% by alkalinity | 48.29 | 45.76 | 45.85 | 45.33 | 51.30 |
| Amine content - wt% by gas chromatography | 48.11 | 48.45 | 49.33 | 49.48 | 54.56 |
| $CO_2$ wt% | 0.34 | 0.08 | 0.009 | 0.010 | 0.007 |
| $CO_2$ content (moles $CO_2$/moles amine) | 0.0176 | 0.0045 | 0.0005 | 0.0006 | 0.0004 |
| $H_2S$ wt% | 0.09 | 0.02 | 0.0001 | 0.0001 | 0.0001 |
| $H_2S$ content (moles $H_2S$ / moles amine) | 0.0062 | 0.0014 | 0.0000 | 0.0000 | 0.0000 |

Figure 3

|  |  | Inlet (before scrubbing) ppm | After scrubbing, ppm | Percent Removal |
|---|---|---|---|---|
| Scrubbing Reagent | MDEA (39.1% by wt) Piperazine (7.7 % by wt.) |  |  |  |
| Acid in Scrubbing Fluid | $H_3PO_4$ (0.47 % by wt.) |  |  |  |
| Inlet Gas Pressure (during absorption) | 935 psig [6446.6kPa] |  |  |  |
| Inlet Gas Temperature (during absorption) | 78 degrees F [25.6 deg C] |  |  |  |
| Contaminants in Gas |  |  |  |  |
| Hydrogen sulfide |  | 8457.9 | Not Detectable ("ND") | 100 |
| methyl mercaptan |  | 20.8 | 0.3 | 98.56 |
| ethyl mercaptan |  | 40.8 | 4.8 | 88.24 |
| dimethyl sulfide |  | 0.9 | ND | 100 |
| carbon disulfide |  | 0.1 | ND | 100 |
| I-propyl mercaptan |  | 18.6 | 5.6 | 69.89 |
| T-butyl mercaptan |  | 1.4 | 0.6 | 57.14 |
| N-propyl mercaptan |  | 2.3 | 0.4 | 82.61 |
| methyl ethyl sulfide |  | 1.7 | 0.2 | 88.24 |
| S-butyl mercaptan/thiophene |  | 4.8 | ND | 100 |
| diethyl sulfide |  | 0.4 | ND | 100 |
| N-butyl mercaptan |  | 0.5 | ND | 100 |
| Dimethyl disulfide |  | 0.2 | ND | 100 |
| Undetermined organic sulfur |  | 1.5 | ND | 100 |
| Total Non-$H_2$S sulfur contaminants |  | 94.4 | 13.1 | 86.12 |
| Total organic sulfur |  | 8552.3 | 13.1 | 99.85 |

Figure 4

|  |  | Inlet 1 (before scrubbing) ppm | Inlet 2 (before scrubbing) ppm | After scrubbing, ppm | Percent Removal |
|---|---|---|---|---|---|
| Scrubbing Reagent* | MDEA (48.9 % by wt) Piperazine (9.2 % by wt.) |  |  |  |  |
| Acid in Scrubbing* Fluid | $H_3PO_4$ (0.16 % by wt.) |  |  |  |  |
| Inlet Gas Pressure (during absorption) | 935 psig [6446.6kPa] |  |  |  |  |
| Inlet Gas Temperature (during absorption) | 78 degrees F [25.6 deg C] |  |  |  |  |
| Contaminants in Gas |  |  |  |  |  |
| Hydrogen sulfide |  | 8206.8 | 7487.5 | 0.2 | 99.9 |
| methyl mercaptan |  | 25.9 | 28.6 | 4.7 | 83.57 |
| ethyl mercaptan |  | 51.5 | 60.3 | 15.6 | 74.13 |
| dimethyl sulfide |  | 1.3 | 2.1 | 0.4 |  |
| carbon disulfide |  | 0.3 | 0.2 | ND | 100 |
| I-propyl mercaptan |  | 26.4 | 33.1 | 9.7 | 70.69 |
| T-butyl mercaptan |  | 2.4 | 3.1 | 0.8 | 74.19 |
| N-propyl mercaptan |  | 3.3 | 4.4 | 1.1 | 75.00 |
| methyl ethyl sulfide |  | 2.2 | 3.2 | 0.6 | 81.25 |
| S-butyl mercaptan/thiophene |  | 8.3 | 10.4 | 2.4 |  |
| I-butyl mercaptan |  | 0.4 | 1.0 | ND | 100 |
| diethyl sulfide |  | 0.8 | 1.0 | 0.3 |  |
| N-butyl mercaptan |  | 0.8 | 0.9 | 0.6 |  |
| Dimethyl disulfide |  | 0.2 | 0.3 | 0.1 |  |
| Undetermined organic sulfur |  | 4.0 | 6.5 | 0.9 |  |
| Total Non-$H_2$S sulfur contaminants |  | 127.8 | 155.1 | 37.2 | 76.02 |
| Total organic sulfur |  | 8334.6 | 7642.6 | 37.4 | 99.51 |
| *These data were taken two weeks before the remaining measures in this figure. |  |  |  |  |  |

Figure 5A

| Scrubbing Fluid | Test 1 | Test 2 | Test 3 |
|---|---|---|---|
| Scrubbing reagent 1 | MDEA, 40.5% wt. | MDEA, 41.4% wt. | MDEA, 28.0% wt. |
| Scrubbing reagent 2 | Piperazine, 5.0% wt. | Piperazine, 6.5% wt. | Piperazine, 4.0% wt. |
| Total amines | 45.5% wt. | 47.9% wt. | 32% wt. |
| Acid (ppmw) | $H_3PO_4$, 8310 | $H_3PO_4$, 7770 | $H_3PO_4$, 4875 |
| Acid, (moles acid / moles amine) | $H_3PO_4$, 0.0213 | $H_3PO_4$, 0.0188 | $H_3PO_4$, 0.0176 |
| Absorption Conditions | | | |
| Inlet gas flowrate, (MMSCFD)[m3/hr] | (1.33)[1569.4] | (1.2)[1416] | (1.36)[1604.8] |
| Inlet gas press.,(psig)[kPa] | (117)[47.2] | (118)[47.8] | (124)[51.1] |
| Inlet gas temp.,(F)[C] | (45)[7.2] | (53)[11.7] | (76)[24.4] |
| Scrubbing fluid temp(F)[C] | (88)[31.1] | (101)[38.3] | (104)[40] |
| Scrubbing fluid flowrate, gpm | (20)[-6.67] | (20)[-6.67] | (27)[-2.78] |
| Desorption Conditions | | | |
| Overhead temp.,(F)[C] | (230)[110] | (228)[108.9] | (227)[108.3] |
| Overhead press.,(psig)[kPa] | (11.7)[80.7] | (10.0)[68.9] | (13.0)[89.6] |

Figure 5B

| Gas Contaminants | Test 1 Before Scrubbing ppmv | Test 2 After Scrubbing ppmv / % removed | Test 2 Before Scrubbing ppmv | Test 2 After Scrubbing ppmv / % removed | Test 3 Before Scrubbing ppmv | Test 3 After Scrubbing ppmv / % removed |
|---|---|---|---|---|---|---|
| Hydrogen sulfide | 19,700 | 0.80 / 100% | 20,000 | 1.50 / 99.99% | 18,100 | 1.40 / 99.99% |
| Carbon dioxide | 43,000 | 1040 / 97.58% | 43,000 | 0.00 / 100% | 43,000 | 1910 / 95.56% |
| Carbonyl sulfide | 19.504 | 0.29 / 98% | 50.70 | 0.84 / 98% | 44.823 | 1.75 / 96% |
| Carbon disulfide | 9.42 | 0.43 / 95% | 5.82 | 0.44 / 92% | 3.29 | 0.37 / 89 % |
| Dimethyl sulfide | 30.85 | 19.68 / 36% | 23.45 | 14.04 / 40% | 21.17 | 19.48 / 8% |
| Dimethyl disulfide | 22.78 | 28.095 / 0 % | 6.54 | 20.68 / 0% | 5.75 | 27.22 / 0% |
| Methyl mercaptan | 176.71 | 0.39 / 100 % | 131.96 | 36.84 / 72% | 142.73 | 42.28 / 70% |
| Ethyl mercaptan | 84.04 | 0.65 / 99% | 96.77 | 28.31 / 71% | 98.97 | 34.85 / 65% |
| Iso-propyl mercaptan | 22.12 | 0.21 / 99% | 30.44 | 19.43 / 36% | 25.24 | 15.96 / 37% |
| N-propyl mercaptan | 51.89 | 9.04 / 83% | 41.91 | 12.02 / 71% | 34.81 | 13.74 / 61% |
| Ethyl methyl sulfide | 6.34 | 1.96 / 69% | 4.64 | 2.56 / 45% | 3.00 | 3.01 / 0% |
| Iso-butyl mercaptan | 24.50 | 3.65 / 85% | 11.23 | 8.43 / 25 | 12.64 | 6.72 / 0% |
| N-butyl mercaptan | 12.01 | 11.37 / 5% | 7.06 | 12.95 / 0% | 8.19 | 10.35 / 0% |
| Diethyl sulfide | 2.33 | 0.23 / 90% | 1.93 | 0.40 / 79% | 2.55 | 0.33 / 87% |
| Sec-butyl mercaptan | 1.70 | 1.02 / 40% | 1.81 | 2.12 / 0% | 0.97 | 1.41 / 0% |
| Tert-butyl mercaptan | 9.16 | 0.93 / 90% | 6.19 | 5.16 / 17% | 3.16 | 4.53 / 0% |
| Pentyl & heavier mercaptans | 42.16 | 13.77 / 67% | 34.53 | 16.73 / 52% | 42.41 | 19.92 / 53% |
| 2-methylthiophene | 3.37 | 0.86 / 75% | 2.85 | 1.31 / 54% | 1.94 | 0.87 / 55% |
| 3-methylthiophene | 4.91 | 1.70 / 65 % | 5.45 | 2.26 / 59% | 3.76 | 1.52 / 59% |
| Thiophene | 14.33 | 4.66 / 67% | 10.87 | 7.07 / 35% | 9.21 | 6.15 / 33% |
| Total Benzothiophenes | 21.15 | 8.29 / 61% | 26.47 | 12.75 / 52% | 37.03 | 18.67 / 50% |

Figure 5C

| Contaminants in Scrubbing Fluid - after scrubbing | Test 1 | Test 2 | Test 3 |
|---|---|---|---|
| Hydrogen sulfide* | 0.059 mol $H_2S$ / mol amine | 0.052 mol $H_2S$ / mol amine | 0.058 $H_2S$ /mol amine |
| Carbon dioxide* | 0.13 mol $CO_2$ / mol amine | 0.11 mol $CO_2$ / mol amine | 0.14 mol $CO_2$ / mol amine |
| Contaminants in Scrubbing Fluid - after desorption | | | |
| Hydrogen sulfide | 0.004 mol $H_2S$ / mol amine | 0.04 mol $H_2S$ / mol amine | 0.02 mol $H_2S$ / mol amine |
| Carbon dioxide | 0.002 mol $CO_2$ / mol amine | 0.01 mol $CO_2$ / mol amine | 0.01 mol $CO_2$ / mol amine |
| | | | |
| * estimated via mass balance using before and after scrubbing gas contaminant concentrations shown in figure 5B | | | |

SCRUBBING FLUID AND METHODS FOR USING SAME

CROSS-REFERENCE TO RELATED APPLICATIONS

This is a continuation of U.S. non-provisional patent application Ser. No. 17/033,044, filed Sep. 25, 2020 (now U.S. Pat. No. 11,229,875), which is incorporated herein by reference and priority to/of it is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND

Field of the Invention

The invention relates to removing contaminants from fluid streams in general and gas streams in particular.

Prior Art

Scrubbing solutions are known. Commonly, the scrubbing solution will include one or more reagents selected to react with the contaminants to be removed from a fluid. The scrubbing solution is usually a liquid, in which the fluid to be scrubbed is preferably no more than minimally soluble under ambient conditions and less so under elevated temperatures. When the fluid to be scrubbed is a gas, the gas will be passed through the scrubbing solution, and the reagent(s) will react with the contaminant(s). The gas will exit the scrubbing solution while the contaminants will remain in the scrubbing solution, bound to the reagent(s). When the fluid to be scrubbed is a liquid, the scrubbing solution will be mixed with the liquid and the reagent(s) will react with the contaminants. The liquids will be separated according to a variety of conventional methods, including gravity/density separation. Again, the contaminants will remain in the scrubbing solution.

The scrubbing solution is typically used in a cyclical process in which the solution is recycled. To efficiently remove the contaminants during absorption, the contaminants captured by the scrubbing solution must be removed from the scrubbing solution before it is reused.

While variance of temperature and pressure has long been used to remove contaminants from scrubbing solutions, the release of contaminants via changes in pressure and temperature alone tends to be less than complete. Additives may be introduced to the scrubbing solution to facilitate the release of the contaminants during desorption. However, the use of additives presents a fundamental design obstacle to the system. The reagents need to readily react with the contaminants, yet give up the contaminants easily. Additives which enhance the ability of reagents to release the contaminants tend to inhibit the ability of the reagents to capture the contaminants and vice versa. Accordingly, a scrubbing solution meeting the following objectives is desired.

SUMMARY

Objects of the Invention

It is an object of the invention to provide a scrubbing solution that can effectively remove contaminants from a target fluid.

It is another object of the invention to provide a scrubbing solution that can efficiently release contaminants after removing them from a target fluid.

It is still another object of the invention to provide a scrubbing solution that can efficiently release contaminants without substantially inhibiting the ability of the scrubbing solution to capture contaminants.

It is yet another object of the invention to provide a scrubbing solution configured to remove contaminants containing sulfide from a target fluid.

It is still another object of the invention to provide a scrubbing solution configured to remove contaminants containing mercaptans from a target fluid.

It is yet another object of the invention to provide a scrubbing solution configured to remove contaminants containing hydrogen sulfide from a target fluid.

It is still another object of the invention to provide a scrubbing solution configured to remove contaminants containing carbonyl sulfide from a target fluid.

It is yet another object of the invention to provide a scrubbing solution configured to remove contaminants containing carbon dioxide from a target fluid.

Summary of the Invention

The invention comprises a scrubbing fluid and a method of using the same. The scrubbing fluid contains one or more amine containing scrubbing reagents. Examples of amine containing scrubbing reagents include methyl diethanolamine ("MDEA") and piperazine. At least one of the scrubbing reagents will preferably contain a primary or secondary amine. During absorption, the scrubbing solution is applied to a fluid to be scrubbed. The amines are selected to remove acidic contaminants from the fluid being scrubbed. Common acidic contaminants include hydrogen sulfide ($H_2S$), carbon dioxide ($CO_2$), and mercaptans (R—SH). The amines will react with the contaminants, securing the contaminants in the scrubbing fluid and removing them from the fluid being scrubbed.

During desorption, the contaminants are removed from the scrubbing fluid so that it can be reused. When the scrubbing fluid is under pressure, the pressure may be reduced during desorption to release some of the contaminants. Regardless of the pressure of the scrubbing fluid, the scrubbing fluid may be heated to release some of the contaminants.

The scrubbing fluid is also provided with an acid. The inventors have discovered that the addition of an acid to the scrubbing solution enhances the ability of the scrubbing fluid to remove hydrogen sulfide without compromising the ability of the scrubbing fluid to remove carbon dioxide. The enhanced removal of hydrogen sulfide allows the scrubbing fluid to remove additional sulfide contaminants, such as mercaptans.

Preferred acid additives to the scrubbing fluid are polyprotic. Suitable acids include phosphoric acids and sulfuric acids. The phrase "phosphoric acids" is intended to encompass orthophosphoric acid ($H_3PO_4$) and the oligophosphoric acids:pyrophosphoric acid ($H_4P_2O_7$); tripolyphosphoric acid ($H_5P_3O_{10}$); tetrapolyphosphoric acid ($H_6P_4O_9$); and so forth. The phrase "sulfuric acids" is intended to encompass sulfuric acid ($H_2SO_4$); persulfuric acid ($H_2SO_5$); pyrosulfuric acid ($H_2S_2O_7$); dithionous acid ($H_2S_2O_4$); tetrathionic acid ($H_2S_4O_6$); and thiosulforous acid ($H_2S_2O_2$). The amount of acid used will depend on the amount of amine scrubbing reagents in the scrubbing fluid.

BRIEF DESCRIPTION OF THE DRAWINGS

Reference will now be made to the drawings, wherein like parts are designated by like numerals, and wherein:
FIG. 1 is a chart of the data from example 1,
FIG. 2 is a chart of the data from example 2.
FIG. 3 is a chart of the data from example 3.
FIG. 4 is a chart of the data from example 4,
FIG. 5A is a chart of the data from example 5.
FIG. 5B is a chart continuing the data from example 5,
FIG. 5C is a chart continuing the data from example 5.

DETAILED DESCRIPTION OF THE BEST MODE

A scrubbing fluid is disclosed. In one embodiment, the scrubbing fluid is an aqueous solution, One or more reagents are added to the aqueous solution, The reagents are selected to react with the contaminants in the target fluid. In one embodiment, the reagents are amines. In one embodiment, one of the reagents is methyl diethanolamine ("MDEA"), In another embodiment, one of the reagents is a primary or secondary amine. In another embodiment, one of the reagents is piperazine. In another embodiment, MDEA and piperazine are used together.

Other suitable scrubbing reagents include dimethylethanolamine, triethanolamine, monoethanolamine, monomethylethanolamine, diethanolamine, methylpiperazine, morpholine, 2-amino-1-butanol, 2-amino-propanol, 2-amino-3-methyl-1-butanol, 2-amino-1-pentanol, 2-amino-1-hexanol 2-amino-1-octanol, aminoethoxyethanol, 2-amino-2-methyl-1-propanol, 1-(2-hydroxyethyl)piperazine, diisopropanolamine, and sterically hindered amines such as 2-(N-methylamino)-2-methylpropan-1-ol, 2-(N-sec-butylamino)-2-methylpropan-1-ol(SBAE), and (2-(N-t-butylamino)-2-methylpropan-1-ol, and Flexsorb SE™, a sterically hindered alkanolamine ($C_8H_{19}NO_{13}$) available from the Monument Chemical Company of Pasadena, Tex. The scrubbing solution may be comprised of one or more of any of the foregoing scrubbing agents or similar amine containing scrubbing agents used alone or in combination with other, non-amine scrubbing agents.

In one embodiment, MDEA comprises between about 20 and about 60 percent by weight of the scrubbing fluid and piperazine comprises between about 0.1 and about 10 percent by weight of the scrubbing fluid (unless otherwise indicated, when used herein the term "about" means plus or minus 10 percent). In one embodiment, MDEA comprises about 42.0 percent by weight of the scrubbing fluid and the piperazine comprises about 8.0 percent by weight of the scrubbing fluid, with the balance being water and acid as discussed below. In another embodiment MDEA comprises about 35.0 percent by weight of the scrubbing fluid and the piperazine comprises about 5.0 percent by weight of the scrubbing fluid, with the balance being water and acid.

In many of the embodiments discussed, the only ingredients in the scrubbing solution were water, acid, and scrubbing reagents. However, if the fluid being treated has foaming issues, an anti-foam agent may be added. Polyglycol and silicone based anti-foam agents will be suitable in most instances. Other potential additives include physical solvents, corrosion inhibitors, and oxygen scavengers.

Some of the common target contaminants are sulfide containing compounds such as hydrogen sulfide, mercaptans, and carbonyl sulfide (COS). Another common contaminant is carbon dioxide. Several other target contaminants are listed in the figures as discussed in the examples.

Hydrogen sulfide and carbon dioxide are the most common target contaminants. However, their presence can make the removal of other target contaminants very difficult. For example, the pKa of $H_2S$ is much, much lower than the pKa of most mercaptans at ambient temperatures. As long as there is any $H_2S$ in the fluid being scrubbed, the amine scrubbing reagents will react with the $H_2S$ over the mercaptans. Essentially all of the $H_2S$ has to be removed before the amine scrubbing reagents will capture mercaptan contaminants.

Piperazine and MDEA each contain amine functional groups. MDEA is a tertiary amine. Piperazine includes two secondary amines. The amines in these reagents are believed to react well with most, if not all of the above listed contaminants. In any event, MDEA and piperazines are good scrubbing reagents for the targeted contaminants, and they work particularly well in tandem.

In one embodiment of the invention, pressure varies significantly between the absorption and desorption sides of the scrubbing process. On the absorption side of the process, the pressure may be elevated while the temperature ranges from ambient to as high as 180 to 190 degrees F. (82.2 to 87.8 degrees C.). These conditions facilitate absorption of the contaminants by the scrubbing solution. Specifically, the elevated pressure—typically, at least about 50 to about 150 psig (about 344.7 to about 1034.2 kPa) and often about 1000 psig (6894.8 kPa) or higher forces the contaminants into solution in the scrubbing solution. The solubility of most gases is inversely related to temperature, so more gas may be dissolved in the scrubbing solution at lower temperatures. Once in solution, the contaminants may react with and become bound to the reagents.

On the desorption side, the pressure will be much lower—typically 10-12 psig (68.9-82.7 kPa) while the scrubbing solution will be heated above about 190 degrees F. (87.8 degrees C.) and to as high as about 325 degrees F. (162.8 degrees C.) and, in one embodiment, to about 260 degrees F. (126.7 degrees C.). This tends to cause the scrubbing solution to release the contaminants absorbed on the absorption side of the process. Many of the contaminants simply dissolved in the scrubbing solution will degas because of the drop in pressure. Likewise, heating the scrubbing solution will have a similar effect on gasses dissolved in the scrubbing solution as the solubility of most relevant gasses goes down as temperature goes up.

Removing dissolved gasses from the scrubbing solution will effect the equilibrium of gasses bound to the scrubbing reagents. The quantity of contaminants that will react with the scrubbing reagents depends, in part, on the amount of contaminants dissolved in the solution. More contaminants dissolved in the solution means more contaminants will react with the reagents. As the quantity of contaminants dissolved in the scrubbing solution falls, the equilibrium shifts and fewer contaminants will remain bound to the reagents.

The invention involves the addition of an acid to the scrubbing fluid. In one embodiment the acid is phosphoric acid. In another embodiment, the acid is sulphuric acid. The amount of acid used will depend upon the amount of scrubbing reagent present. Where the scrubbing reagents are amines or include amine functional groups, between about 0.004 moles to about 0.80 moles acid will be provided per mole of amine containing reagent. Where the scrubbing reagents are MDEA and piperazine and the acid, the preferred range of phosphoric acid is between 0.004 to about 0.16 moles acid per mole of amine. Where the scrubbing reagents are MDEA and piperazine, the preferred range of sulfuric acid is between about 0.004 to about 0.49 moles acid per mole amine. In one embodiment where the scrubbing reagents are MDEA and piperazine and the acid is phosphoric acid, between about 0.018 moles to about 0.036 moles of acid are provided per mole of amine containing reagent.

The addition of phosphoric acid to solutions containing tertiary amines, such as MDEA, in order to reduce $H_2S$ levels in the scrubbing solution is known. However, it is contraindicated in scrubbing solutions that contain $CO_2$ and more than trivial amounts of primary or secondary amines. Secondary amines, such as piperazines, react with $CO_2$ to form carbamates and protonated amines. The prior art teaches that the presence of $CO_2$ in the fluid being scrubbed and a primary or secondary amine in the scrubbing solution nullifies the ability of acid to remove $H_2S$ from the scrubbing solution.

The present invention achieves substantial elimination of $H_2S$ from the scrubbing solution via the addition of an acid, despite the presence of high $CO_2$ levels and the use of a secondary amine to react with the $CO_2$. The invention achieves the elimination of $H_2S$ and $CO_2$ from the scrubbing solution. The inventors believe that the very low $H_2S$ levels in the scrubbing solution upon its return to the absorption side of the process, allows the scrubbing solution to capture substantially all of the $H_2S$ from the fluid being scrubbed, This is believed to allow the scrubbing reagents to capture other sulfide containing contaminants, including especially mercaptans, as illustrated in the examples.

During absorption—when the scrubbing fluid is interacting with the fluid to be scrubbed—the temperature will typically be below about 190 degrees Fahrenheit, and commonly between about 70 degrees and 185 degrees F. (21.1 degrees and 85 degrees C.). During absorption, the fluids typically move in opposite directions in a column, See, e.g., U.S. Pat. No. 10,646,818 which is hereby incorporated by reference in its entirety. The scrubbing solution typically enters at the top of the absorption column and moves down while the fluid being scrubbed enters at the bottom and moves up. The absorption process is exothermic, so the scrubbing fluid heats up as it absorbs contaminants. That means that the scrubbing solution is usually coolest when it enters the absorption column and hottest near the bottom of the column. Additionally, the contaminants in the fluid are progressively removed as the fluid moves up the column, The net result of this process is that the fluid being scrubbed will be cleanest at the top of the column where it will also encounter the cleanest and coolest scrubbing solution. Where the fluid being scrubbed is a gas, the partial pressure of the contaminants in the gas will be lowest at the top of the column.

At the top of the absorption side of the process, the temperature will commonly be about 120 to 130 degrees Fahrenheit (48.9 and 54.4 degrees Celsius), and warms as it proceeds through the absorption side of the process. During desorption—when the contaminants are being removed—the temperature is raised to above about 190 degrees Fahrenheit (87.8 degrees Celsius). When MDEA, piperazines, and other amines are used as the scrubbing reagents, temperature increases above about 325 degrees F. (162.8 degrees C.) are undesirable because they can result in thermal degradation of the amines. The hottest place on the desorption side of the process will be where the scrubbing solution exits the desorption side. This will usually be the boiling point of the amine scrubbing reagents at the pressure being applied to the desorption side. The pressure will vary depending on the scrubbing reagents and the contaminants, but temperatures of about 250 to 260 degrees Fahrenheit (121.1 to 126.7 degrees Celsius) are typical.

While the pressure drop and temperature increase discussed above will remove many of the contaminants from the scrubbing fluid, the acid facilitates polishing, allowing for the removal the residual contaminants from the amines. Once released by the amines, the contaminants may be removed from the scrubbing solution. Upon return of the scrubbing solution to the absorption phase of the process, the temperature is lowered.

While the process has been described in the context of a significant pressure variation, it will be appreciated that the effect of the acid is not dependant on the pressure change. Many scrubbing processes involve treatment of low pressure fluid streams in which there is no high pressure to release. Contaminants in such low pressure fluid may be treated with a scrubbing solution in which amine containing scrubbing reagents react with and capture the contaminants. Heating the solution will have the same effect on dissolved gasses in the solution discussed above, and the acid will have the same polishing effect Once the contaminants have been removed, the temperature may be lowered and the scrubbing solution is ready for reuse.

EXAMPLES

Example 1

FIG. 1 provides comparative results of a scrubbing system operated two days apart. On day one, the scrubbing fluid consisted of a combination of MDEA (39.9% by weight) and piperazine (8.1% by weight) and the balance water. Two days later, the scrubbing fluid consisted of a combination of MDEA (41.3% by weight), piperazine (7.7% by weight) and 1.39 percent by weight $H_3PO_4$. Again, the balance was water. This corresponds to 0.033 moles $H_3PO_4$ per mole of amine containing scrubbing reagent The temperature and pressure of the incoming gas streams were similar. The amount of contaminants ($CO_2$ and $H_2S$) in the gas to be scrubbed were slightly higher on the second day. The flow rate of the scrubbing fluids, provided in both millions of standard cubic feet per day (MMSCFD)(and cubic meters per hour) were quite similar on both days as was the incoming temperature of the scrubbing fluid. There were slightly more moles of contaminant per mole of amine containing scrubbing reagents on the second day than on the first. The temperatures in the desorption column were similar. Overhead temperatures are reported. This is the temperature of the steam used to heat the column at the top of the column. Temperatures of the scrubbing fluid within the column were measured using infrared sampling. They reached a maximum of about 150 degrees F. (65.6 degrees C.) on day 2.

The results for $H_2S$ and $CO_2$, scrubbing were outstanding. The acidified scrubbing solution removed an order of magnitude more $H_2S$: 0.07 ppm $H_2S$ remaining in the gas scrubbed with the acid vs. 0.321 $H_2S$ remaining in the gas scrubbed without the acid. This is believed to be attributable to the removal of more of the H₂S contaminants from the scrubbing fluid during desorption, the cleaner scrubbing fluid ultimately being able to remove more contaminants on reuse.

Example 2

FIG. 2 provides a comparison of the scrubbing fluids used in a gas scrubbing system. The last four measurements were taken over a six day period. The first was taken a little over a month earlier. All of the scrubbing reagents contained amines and there were no other amine sources in the scrubbing fluid. Thus, the amine measurements reflect the scrubbing reagents in the scrubbing fluid. The gas chromatography measurements indicate the total amines present. The alkalinity measurement reflects the amines available for reaction with an acid. The amine scrubbing reagents are basic, and the amount present can be determined by measuring how much acid is required to lower the pH to zero. The difference between the gas chromatography numbers and the alkalinity numbers is indicative of the amount of acid contaminants the amine scrubbing agents have picked up during the gas scrubbing process. The heat stable amine salts are indicative of the salts the amine scrubbing reagents have formed during scrubbing with gas contents other than sulfides or carbon dioxide.

The $CO_2$ results reveal an order of magnitude improvement in the acid treated scrubbing fluid compared to the non-acid treated scrubbing fluid. The $H_2S$ results were even better. Two full orders of magnitude improvement were observed. These results indicate that after desorption, the scrubbing fluid treated with the acid contains substantially fewer contaminants compared to scrubbing fluid containing no acid.

Example 3

In example 3, one embodiment of the scrubbing fluid comprising 39.1% by weight MDEA, 7.7% by weight piperazine, 0.47% by weight $H_3PO_4$, and the balance water was used to treat a 33 MMSCFD(38940 m³/hr) gas stream. The gas stream entered the absorption side of the treatment at about 935 psig (6446.6 KPa) and about 78 degrees F. (25.6 degrees C.). The scrubbing fluid was added to the absorption side at a rate of about 400-450 gallons per minute (1514.6-1703.4 liters per minute). On the desorption side, pressure was dropped to about 10.5 psig (72.4 kPa) and the temperature was raised to about 230 degrees F. (110 degrees C.) at the "top" of the desorption process. At the "bottom" the inventors believe the temperature was closer to 250-255 degrees F. (121.1-123.9 degrees C.). The contaminants in the gas stream were measured before and after scrubbing. The results are provided in FIG. 3.

Example 4

In example 4, the same embodiment of the scrubbing solution described in example 3 was used to treat a similar gas stream at the same location as in example 3. However, in example 4, there were two inlets to the absorption side of the process which could be independently sampled. Otherwise, the treatment conditions were the generally the same as recited example 3. The contaminants in the gas stream were measured before and after scrubbing. The results are provide in FIG. 4.

Example 5

In example 5, relatively similar gas streams were treated with different scrubbing fluids. As shown in FIG. 5A, in tests 1 and 2 the amount of MDEA and piperazine were roughly equal, though slightly more amines were used in test 2. In test 3, markedly fewer amines were included in the scrubbing fluid. There was also considerably less acid in the scrubbing fluid of test 3 than in test 1. The acid was added in test 1 and then not replenished, so the results in tests 2 and tests 3 reflect a diminution in the acid content because the acid was being diluted over time. The effect of the diminishing acid content in tests 2 and 3 relative to test 1 can be seen in some of the contaminants. For example, as illustrated in FIG. 5B the methyl mercaptan exhibited a near 100% reduction in test 1 but only a 72 and 70% reduction, respectively, in tests 2 and 3, Similarly, ethyl mercaptan was reduced by 99% in test 1, but only by 71 and 65% in tests 2 and 3, As seen in FIG. 5C, the amount of $H_2S$ remaining in the scrubbing fluid after desorption increased in tests 2 and 3 relative to test 1. In test 1, there was only 0.004 mol $H_2S$ remaining per mol of amine in the scrubbing fluid. In tests 2 and 3, with their lower acid content, the $H_2S$ content remaining after desorption was an order of 5 magnitude higher.

These and other modifications for the formulation of a scrubbing fluid and for the methods of using the same will be apparent to those of skill in the art from the foregoing disclosure and figures and are intended to be encompassed by the scope and spirit of the following claims.

We claim:

1. A scrubbing solution comprising
   at least one scrubbing reagent,
   an acid, and
   water,
   wherein
     said scrubbing reagent has at least
       one primary or secondary amine
   and
   wherein
     the acid is selected from the group consisting of
       phosphoric acids,
       sulfuric acids, and
       combinations thereof,
   wherein the scrubbing solution is between about 0.1 and about 10 percent by weight piperazine.

2. A scrubbing solution according to claim 1 wherein the acid is polyprotic.

3. A scrubbing solution according to claim 1, wherein the acid consists essentially of phosphoric acids.

4. A scrubbing solution according to claim 1 wherein the solution has a ratio of moles of acid to moles of amine.

5. A scrubbing solution according to claim 4 wherein the ratio of moles of acid to moles of amine is between about 0.018 and about 0.036.

6. A scrubbing solution according to claim 5 wherein the scrubbing reagent is selected from the group consisting of methyl diethanolamine and piperazine and combinations thereof.

7. A scrubbing solution according to claim 6 wherein the methyl diethanolamine comprises between about 20 and about 60 percent by weight of the scrubbing solution.

8. A scrubbing solution according to claim 1 wherein the scrubbing reagent is selected from the group consisting of methyl diethanolamine, piperazine, dimethylethanolamine, triethanolamine, monoethanolamine, monomethylethanolamine, diethanolamine, methylpiperazine, morpholine, 2-amino-1-butanol, 2-amino-propanol, 2-amino-3-methyl-1-butanol, 2-amino-1-pentanol, 2-amino-1-hexanol 2-amino-1-octanol, aminoethoxyethanol, 2-amino-2-methyl-1-propanol, 1-(2-hydroxyethyl)piperazine, diisopropanolamine and combinations thereof.

9. A scrubbing solution according to claim 1 wherein the scrubbing reagent comprises a sterically hindered amine.

10. A method for removing acidic contaminants from a fluid wherein the method comprises
passing the fluid through a scrubbing solution comprising at least one scrubbing reagent, an acid, and water; wherein said scrubbing reagent has at least one primary or secondary amine and wherein the acid is selected from the group consisting of phosphoric acids and sulfuric acids, wherein the scrubbing solution is between about 0.1 and about 10 percent by weight piperazine;
binding the acidic contaminants to the scrubbing solution by reacting the contaminants with the scrubbing reagent at a temperature between about 75 degrees F. (23.9 degrees C.) and about 190 degrees F. (87.8 degrees C.), thereby removing the contaminants from the fluid;
separating the scrubbing solution from the fluid; and
heating the scrubbing solution to a temperature between about 190 degrees F. (87.8 degrees C.) and about 325 degrees F. (162.8 degrees C.).

11. A method for removing acidic contaminants from a fluid according to claim 10 wherein the heating step comprises heating the scrubbing solution to a temperature between about 190 degrees F. (87.8 degrees C.) and about 260 degrees F. (126.7 degrees C.).

12. A method for removing acidic contaminants from a fluid according to claim 10 wherein the acid is polyprotic.

13. A method for removing acidic contaminants from a fluid according to claim 10 wherein the acid consists essentially of phosphoric acids.

14. A method for removing acidic contaminants from a fluid according to claim 10 wherein the acid consists essentially of sulfuric acids.

15. A method for removing acidic contaminants from a fluid according to claim 10 wherein the solution has a ratio of moles of acid to moles of amine.

16. A method for removing acidic contaminants from a fluid according to claim 15 wherein the ratio of moles of acid to moles of amine is between about 0.018 and about 0.036.

17. A method for removing acidic contaminants from a fluid according to claim 10 wherein the scrubbing reagent is selected from the group consisting of methyl diethanolamine, piperazine, dimethylethanolamine, triethanolamine, monoethanolamine, monomethylethanolamine, diethanolamine, methylpiperazine, morpholine, 2-amino-1-butanol, 2-amino-propanol, 2-amino-3-methyl-1-butanoL 2-amino-1-pentanol, 2-amino-1-hexanol 2-amino-1-octanol, aminoethoxyethanol, 2-amino-2-methyl-1-propanol, 1-(2-hydroxyethyl)piperazine, diisopropanolamine, sterically hindered amines, and combinations thereof.

18. A method for removing acidic contaminants from a fluid according to 10 wherein the fluid passed through the scrubbing solution and the scrubbing solution are pressurized to at least about 150 psig (1034.2 kPa) when the fluid is passed through the scrubbing solution.

19. A method for removing acidic contaminants from a fluid according to claim 18 further comprising reducing the pressure on the scrubbing solution after the scrubbing solution and the fluid are separated.

20. A methods for removing acidic contaminants from a fluid according to claim 10 wherein the contaminants comprise sulfides.

* * * * *